United States Patent
Akagi et al.

(10) Patent No.: US 7,645,528 B2
(45) Date of Patent: Jan. 12, 2010

(54) MAGNETIC RECORDING MEDIA WITH ULTRA-HIGH RECORDING DENSITY

(75) Inventors: Fumiko Akagi, Tokyo (JP); Tatsuya Hinoue, Kanagawa (JP); Atsushi Nakamura, Tokyo (JP); Tomoo Yamamoto, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 621 days.

(21) Appl. No.: 11/226,971

(22) Filed: Sep. 14, 2005

(65) Prior Publication Data
US 2006/0057428 A1  Mar. 16, 2006

(30) Foreign Application Priority Data
Sep. 15, 2004  (JP) .............................. 2004-268399

(51) Int. Cl.
*G11B 5/66* (2006.01)
(52) U.S. Cl. ..................... 428/828.1; 428/828
(58) Field of Classification Search .............. 428/828.1, 428/360
See application file for complete search history.

(56) References Cited

U.S. PATENT DOCUMENTS

| 4,652,499 | A | 3/1987 | Howard | |
|---|---|---|---|---|
| 6,759,138 | B2 * | 7/2004 | Tomiyasu et al. | 428/828.1 |
| 6,773,834 | B2 * | 8/2004 | Do et al. | 428/828 |
| 6,893,735 | B2 * | 5/2005 | Acharya et al. | 428/611 |

FOREIGN PATENT DOCUMENTS

| JP | 1987-257618 | 11/1987 |
|---|---|---|
| JP | 1988-197018 | 8/1988 |
| JP | 2001-148110 A | 5/2001 |
| JP | 2003-085729 A | 3/2003 |
| JP | 2004-515028 | 5/2004 |

OTHER PUBLICATIONS

Pu-Ling Lu et al., "Thermal Instability at Gbit/in² Magnetic Recording", IEEE Transactions on Magnetics, vol. 30 No. 6, Nov. 1994.

(Continued)

*Primary Examiner*—Kevin M. Bernatz
*Assistant Examiner*—Gary D. Harris
(74) *Attorney, Agent, or Firm*—Townsend and Townsend and Crew LLP; Darren Gold

(57) ABSTRACT

An AFC magnetic recording medium having a three-layered ferromagnetic structure capable of reducing noises without deteriorating thermal stability is provided in order to achieve ultra-high recording density. In one embodiment, the AFC magnetic recording medium has a magnetic recording layer formed on a substrate via an underlayer, the magnetic recording medium consisting of a first ferromagnetic layer formed on the underlayer, a second ferromagnetic layer formed on the first ferromagnetic layer via a nonmagnetic layer inducing the antiferromagnetic interaction, and a third ferromagnetic layer formed on the second ferromagnetic layer, wherein the center of gravity G of the magnetic recording medium is defined using the distance $t_g$ from the upper surface of the third ferromagnetic layer as:

$t_g = (M_s t)_{eff}/(2M_{S3})$; when the center of gravity G is at the third ferromagnetic layer, $t_g = ((M_s t)_{eff}/2 - M_{S3} t_3)/M_{S2} + t_3$; when the center of gravity G is at the second ferromagnetic layer, and when the total film thickness of the magnetic recording layer is $t_{total}$, the value $t_g/t_{total}$ is lower than about 0.33.

4 Claims, 5 Drawing Sheets

(a)

(b)

OTHER PUBLICATIONS

Michael Madison et al., "Beyond 35 GBIT/IN$^2$: Using a Merged Notched head on Advanced Thermally Stable Media", Digest, Intermag 2000 conf., IEEE, HT-01.

Eric Fullerton et al., "Antiferromagnetically Coupled Magnetic Media Layers for Thermally Stable High-Density Recording", Applied Physics Letters, vol. 77, No. 23, Dec. 4, 2000.

* cited by examiner (a)  (b)

(Prior art)

MAGNETIC RECORDING MEDIA WITH ULTRA-HIGH RECORDING DENSITY

CROSS-REFERENCES TO RELATED APPLICATIONS

This application claims priority from Japanese Patent Application No. JP2004-268399, filed Sep. 15, 2004, the entire disclosure of which is incorporated herein by reference.

BACKGROUND OF THE INVENTION

The present invention relates to a magnetic recording medium based on the longitudinal recording system, appropriate for ultra-high density recording, capable of obtaining thermally stable recording information with low noise.

It is desired that a magnetic disc device has a large capacity as an external magnetic recording device for a computer. For increasing the capacity, or achieving a higher recording density, the challenge for a magnetic recording medium is to lower noises. A magnetic recording medium has, for example a structure formed by providing a Co-alloy recording magnetic layer such as CoCrTa, CoCrPt and an overcoat film on a substrate via a Cr underlayer controlling the crystalline magnetic anisotropy of the magnetic layer (JP-A No. 257618/1987, JP-A No. 197018/1988), and in the past, the grain size was made finer, the film thickness was made thinner and the coercivity was made higher for lowering of noises. Thereby, the magnetization disorder in the magnetization transition region between recording bits, which might cause noises, can be smaller and the magnetization transition region can be narrower. However, finer magnetic grains and thinner recording layer might cause thermal fluctuation in the recorded magnetization and accordingly, the magnetization might be decayed. In general, the value $K_u \cdot V/(k \cdot T)$ calculated by dividing the product of a magnetic anisotropy coefficient $K_u$ and a grain volume V by the product of a Boltzmann's constant and a temperature T is known as thermal stability factor (IEEE Trans. Magn. 30 (1994) p. 4230). $K_u \cdot V/(k \cdot T)$ indicates that a medium is thermally more unstable as this value gets smaller. From the thermal stability factor, even when the grain size is finer and the film thickness is thinner, thermal stability can be achieved by using a large $K_u$ material. However, a medium with large $K_u$ cannot be recorded by a magnetic head because large $K_u$ is equivalent to a large anisotropic magnetic field. With the similar reason, the coercivity cannot easily be made larger.

As a means for achieving high recording density without increasing $K_u$, a magnetic recording medium having at least two ferromagnetic layers antiferromagnetically coupled with each other via a nonmagnetic layer was proposed (JP-A No. 148110/2001). At the Intermag international conference (Digest (Intermag 2000 conf.) IEEE, HT-01) held in April 2000, and in Appl. Phys. Lett. 77(2000) 3806, a medium formed by antiferromagnetically coupling two-layered and three-layered ferromagnetic layers (antiferromagnetically-coupled medium ('AFC medium' for short)) was reported to have excellent thermal stability and read-write characteristics. Then, these AFC media have been energetically investigated at various companies and institutions and have been used for today's magnetic disc devices.

FIG. 2 shows a simple schematic diagram illustrating a sectional structure and magnetic moments of a conventional magnetic recording medium when the AFC medium has two ferromagnetic layers. As shown in the drawing, the magnetic moment of the lower ferromagnetic layer 3 is in the opposite direction to the magnetic moment of the upper ferromagnetic layer 5. This is because the nonmagnetic layer 4 containing a material made of Ru, Cr, Rh, Ir, Cu or their alloys is used for antiferromagnetically coupling ferromagnetic layers 3, 5 placing the nonmagnetic layer therebetween. Where the saturation magnetization of the lower ferromagnetic layer 3 is $M_{S1}$, the film thickness is $t_1$, the saturation magnetization of the upper ferromagnetic layer 5 is $M_{su}$, and the film thickness is $t_u$, the effective product $(M_s t)_{eff}$ of the saturation magnetization and the film thickness of the entire recording layer is shown below.

$$(M_s t)_{eff} = M_{su} t_u - M_{s1} t_1$$

Accordingly, $(M_s t)_{eff}$ of the recording medium is smaller than that of a single-layered medium made solely of a second ferromagnetic layer, and the noises would be reduced. In addition, since both the upper and lower ferromagnetic layers contribute to achieving thermal stability, the thermal stability would be improved compared to the single-layered ferromagnetic layer medium.

However, as the capacity gets larger, even with using the AFC medium, it would be difficult to achieve higher recording density. This is because finer magnetic grains and thinner films are increasingly required for obtaining required SNR (signal-to-noise ratio), and at the same time, the structure of the AFC medium for securing thermal stability has come to the limit. That is, for securing finer magnetic grains and thinner films and thermal stability at the same time, it is required to increase the thickness of lower ferromagnetic layers while increasing the thickness of upper ferromagnetic layers. However, the antiferromagnetic boundary coupling energy density $J_{ex}$ induced by the nonmagnetic layer is limited, and the magnetic coupling field $H_{ex}$ generated by $J_{ex}$, which applies to the lower magnetic layer would be reduced in inverse proportion to the film thickness $t_1$ of the lower ferromagnetic layer, as shown in the following formula.

$$H_{ex} = J_{ex}/(M_{s1} t_1)$$

Accordingly, as the film thickness is larger, the antiferromagnetic coupling of the upper ferromagnetic layer and the lower ferromagnetic layer would be weaker and the effective film thickness would be increased instead of reducing the thickness. This means that differently from the initial intention, $(M_s t)_{eff}$ would be larger, and the noises would be increased. Additionally, the thermal stability would be deteriorated.

In JP-T No. 515028/2004, it is disclosed that lower noises and improved thermal stability can be achieved by providing two upper ferromagnetic layers in an AFC medium and by increasing the saturation magnetization of the ferromagnetic layer further to a substrate than that of the other ferromagnetic layer. However, according to the inventors' investigation, it was found that good SNR can never be obtained even by increasing the saturation magnetization. Additionally, since increasing of $(M_s t)_{eff}$ should be avoided, the ratio of saturation magnetization of the two layers is limited. That is, higher recording density is also limited.

In JP-A No. 85729/2003, it is disclosed that the layer to a substrate side can have a function for preventing turbulence in crystalline magnetic anisotropy at the layer to the substrate side, and good thermal activation and read-write characteristics (medium noise, etc.) can be achieved by providing a plurality of upper ferromagnetic layers in an AFC medium and in a case of providing, for example two layers, by providing one of the layers to the substrate side with thinner film thickness than that of the other layer. This means that the layer to the substrate side has works less as a recording layer.

BRIEF SUMMARY OF THE INVENTION

A feature of the present invention is to provide a magnetic recording medium having two ferromagnetic layers above a nonferromagnetic layer of an AFC medium capable of reducing noises without deteriorating thermal stability in order to achieve ultra-high recording density.

To solve the above mentioned problem, the inventors took the center position of magnetization transitions of a magnetic recording medium into consideration. In a conventional single-layered recording layer medium, the center position of magnetization transitions of the magnetic recording medium (hereinafter, center of gravity G) was considered to be at the center position t/2 in the film thickness (t) direction of the recording layer. That was because the thin film medium consists of single magnetic domain grains and the magnetization of each grain is reversed by the coherent rotation of spin when head field of 1.5 to 2 times as strong as the medium coercivity (corresponding to the anisotropic magnetic field of the medium) is applied to the center of gravity G. Accordingly, the inventors considered that if the center of gravity G could be closer to the recording layer surface than the position of $t_{total}/2$, the noises would be reduced and SNR would be increased because a stronger magnetic field would be applied to the center of gravity and the head field gradient at the center of gravity G would be steeper and the inventors tried to apply this to an AFC medium. Since an AFC medium has multilayered recording layers and the respective magnetic characteristics are different from each other, the inventor considered that the center of gravity of the AFC medium would be of a value calculated by dividing the effective product $(M_s t)_{eff}$ of the saturation magnetization and the film thickness by 2 and they investigated the structure for making the center of gravity G as close as possible to the medium surface using computer simulations and experiments. As a result, by optimizing the combination of saturation magnetization and the film thickness of the ferromagnetic layer above a non-magnetic layer, the inventors found that lower noises could be achieved without deteriorating the thermal stability. That means that in a medium with the structure having two-layered ferromagnetic layers above the non-magnetic layer of an AFC medium, it was found that the film thickness should be also considered as well as the saturation magnetization.

A magnetic recording medium according to one aspect of the present invention has a substrate, an underlayer formed on the substrate, a first ferromagnetic layer formed on the underlayer, a nonmagnetic layer formed on the first ferromagnetic layer, a second ferromagnetic layer formed on the nonmagnetic layer, and a third ferromagnetic layer formed on the second ferromagnetic layer. The first ferromagnetic layer and the second ferromagnetic layer are antiferromagnetically coupled via the nonmagnetic layer, and the second ferromagnetic layer and the third ferromagnetic layer are ferromagnetically coupled. When the saturation magnetization of the first ferromagnetic layer is $M_{S1}$ and the film thickness is $t_1$, the saturation magnetization of the second ferromagnetic layer is $M_{S2}$ and the film thickness is $t_2$, the saturation magnetization of the third ferromagnetic layer is $M_{S3}$ and the film thickness is $t_3$, and the film thickness of the nonmagnetic layer is $t_n$, the effective product $(M_s t)_{eff}$ of the saturation magnetization and the film thickness of the magnetic recording medium is defined as $(M_s t)_{eff} = M_{S2} t_2 + M_{S3} t_3 - M_{S1} t_1$. Furthermore, when the center of gravity G of the magnetic recording medium is defined as the distance $t_g$ from the upper surface of the third ferromagnetic layer to the center of gravity G, and $t_g = (M_s t)_{eff}/(2 M_{S3})$; when the center of gravity G is at the third ferromagnetic layer, $t_g = ((M_s t)_{eff}/2 - M_{S3} t_3)/M_{S2} + t_3$; when the center of gravity G is at the second ferromagnetic layer, the value $t_g/t_{total}$ obtained by normalizing the distance $t_g$ by $t_1 + t_2 + t_3 + t_n (= t_{total})$ is smaller than about 0.33.

It is preferable that the center of gravity G of the magnetic recording medium is at the second ferromagnetic layer (8 in FIG. 1(b)). When the center of gravity G of the magnetic recording medium is at the third ferromagnetic layer (8 in FIG. 1(a)), it is required that $t_g/t_{total}$ is about 0.26 or lower. It is preferable that the ratio of the saturation magnetization $M_{S2}$ of the second ferromagnetic layer to the saturation magnetization $M_{S3}$ of the third ferromagnetic layer is larger than about 1 and the film thickness of the third ferromagnetic layer is smaller than the film thickness of the second ferromagnetic layer.

According to the present invention, an AFC magnetic recording medium having a three-layered ferromagnetic structure capable of reducing noises without deteriorating the thermal stability can be provided.

DETAILED DESCRIPTION OF THE INVENTION

Figure 1:
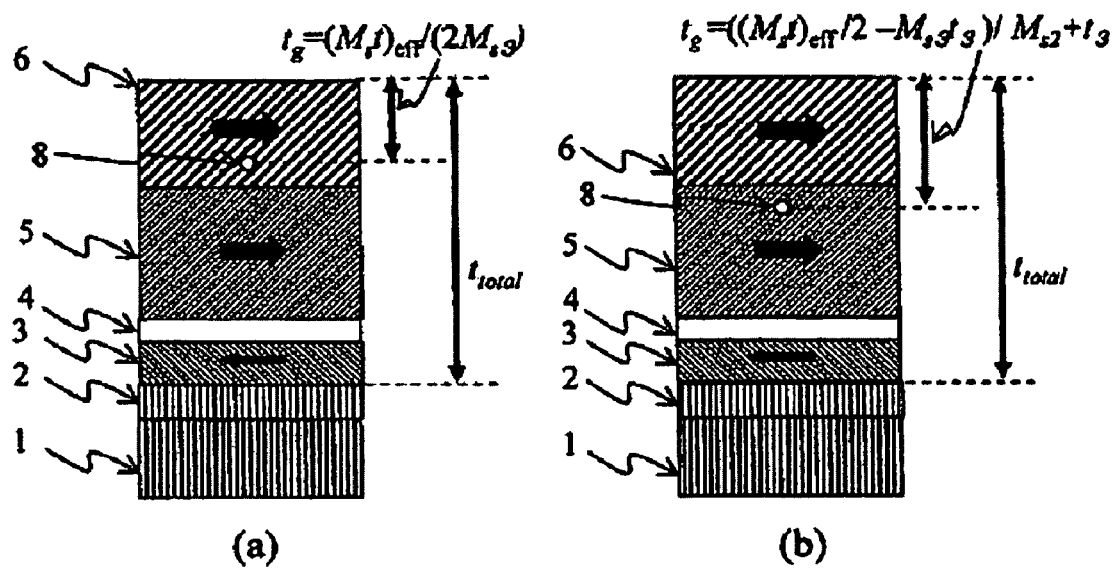
FIG. 1 is a schematic diagram illustrating sectional structures and magnetic moments of the magnetic recording medium according to an embodiment of the present invention; (a) is a view when the center of gravity G is at the third layer; (b) is a view when the center of gravity G is at the second layer.
Figure 2:
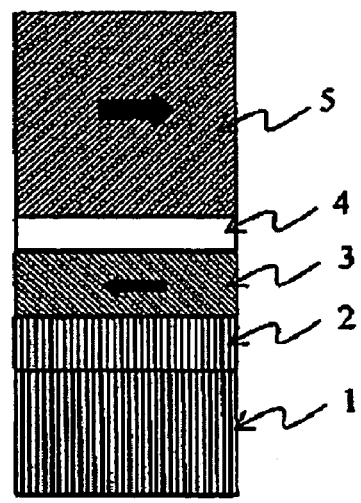
FIG. 2 is a schematic diagram illustrating a sectional structure and magnetic moments of a conventional AFC medium.

The inventors first investigated the effect of the center of gravity G on SNR using computer simulations (J. Appl. Phys. 75(2), 15 Jan. 1994) using the Landau-Lifsits-Gilbert equation. FIG. 1 shows a block diagram of a medium used for the investigation. A recording layer has three-layered ferromagnetic layers: a first magnetic layer 3, a second magnetic layer 5, a third magnetic layer 6, in the order of being closer to an underlayer 2 formed on a substrate 1, a second ferromagnetic layer 5 is formed via a middle layer consisting of a nonmagnetic layer 4 inducing the antiferromagnetic interaction above the first ferromagnetic layer, and a third ferromagnetic layer 6 is further formed on the second ferromagnetic layer 5. The second ferromagnetic layer 5 and the third ferromagnetic layer 6 are ferromagnetically coupled with each other. In FIG. 1(a) the center of gravity G 8 of the magnetic recording medium is at the third ferromagnetic layer, while in FIG. 1(b) the center of gravity G 8 of the magnetic recording medium is at the second ferromagnetic layer. Hereinafter, this medium is called as a three-layered AFC medium.

The medium grain size used for the investigation was set to be 8.5 nm. The film thickness $t_1$ of the first magnetic layer was 3 nm, the film thickness $t_2$ of the second magnetic layer was 6 to 12 nm, the film thickness $t_3$ of the third magnetic layer was 4 to 10 nm, and the total film thickness of the second and third layers was constant 16 nm. The saturation magnetization of the first magnetic layer was 0.4 T, the saturation magnetization $M_{S2}$ of the second magnetic layer was 0.2 to 0.5 T, and the saturation magnetization $M_{S3}$ of the third magnetic layer was 0.3 to 0.8 T. The nonmagnetic layer between the first and second magnetic layers was an Ru layer, the exchange coupling by the Ru layer was strong enough to antiferromagnetically couple the first and second layers, and the coupling energy between the first and second layers was $-0.05 \times 10^{-3}$ J/m. The coupling energy between the second and third layers was $1.2 \times 10^{-3}$ J/m because of strongly magnetostatic coupling between the layers. The effective product of the saturation magnetization and the film thickness was constant $6 \times 10^{-9}$ Tm. The anisotropic magnetic field of the first magnetic layer was 750 kA/m, and the second and third anisotropic magnetic fields were constant 1040 kA/m. At that time, since the thermal stability index $K_uV/(kT)$ found from medium parameters was about 63 in all the conditions, the thermal stability was not deteriorated due to a change in magnetic characteristics. As a comparative embodiment, a simulation for an AFC medium with the same magnetic characteristics and film thickness at the second and third layers, where the film thickness of a first magnetic layer was 1-4 nm, the film thickness of a magnetic layer above a nonmagnetic layer was 15-19 nm, and $(M_s t)_{\it{eff}}$ was constant $6 \times 10^{-9}$ Tm, was performed. In a medium of the comparative embodiment, the anisotropic magnetic field and thermal stability index were the same values as the medium according to the present invention.

Figure 3:
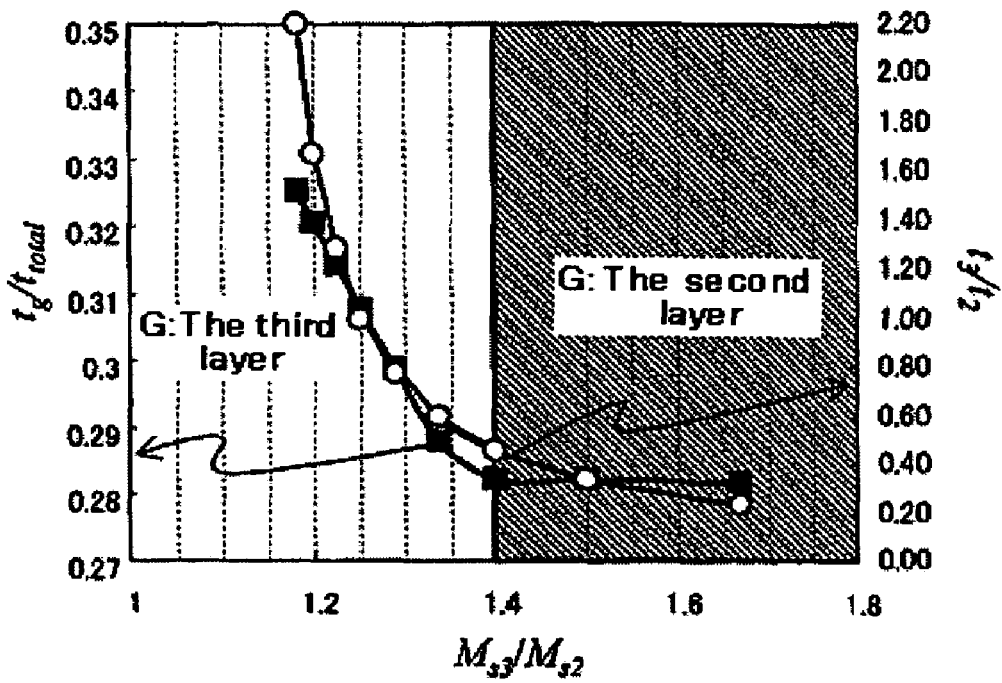
FIG. 3 is a view illustrating the relation of the center of gravity, the second and third ratios of saturation magnetization, and the ratios of film thickness when the ratio of saturation magnetization of the underlayer is 0.4 T.

FIG. 3 is a view illustrating the relation between $t_g/t_{total}$ and $M_{S3}/M_{S2}$ and $t_3/t_2$ when the ratio of saturation magnetization $M_{S2}$ of the second magnetic layer is at constant 0.4 T and the ratio of saturation magnetization $M_{S3}$ of the third magnetic layer is increased. Accordingly, when $M_{S2}$ is constant, $M_{S3}$ has a one-to-one correspondence to $t_3/t_2$, while by decreasing $t_3/t_2$, $M_{S3}$ can be increased and $t_g/t_{total}$ can be decreased. This means that the center of gravity G can be shifted to the medium surface layer side by increasing $M_{S3}/M_{S2}$ and by decreasing $t_3/t_2$. Referring to the drawings, when $M_{S3}/M_{S2}$ is smaller than 1.4, the center of gravity G is at the third layer and while it is 1.4 or larger, the center of gravity G is at the second layer.

Figure 4:
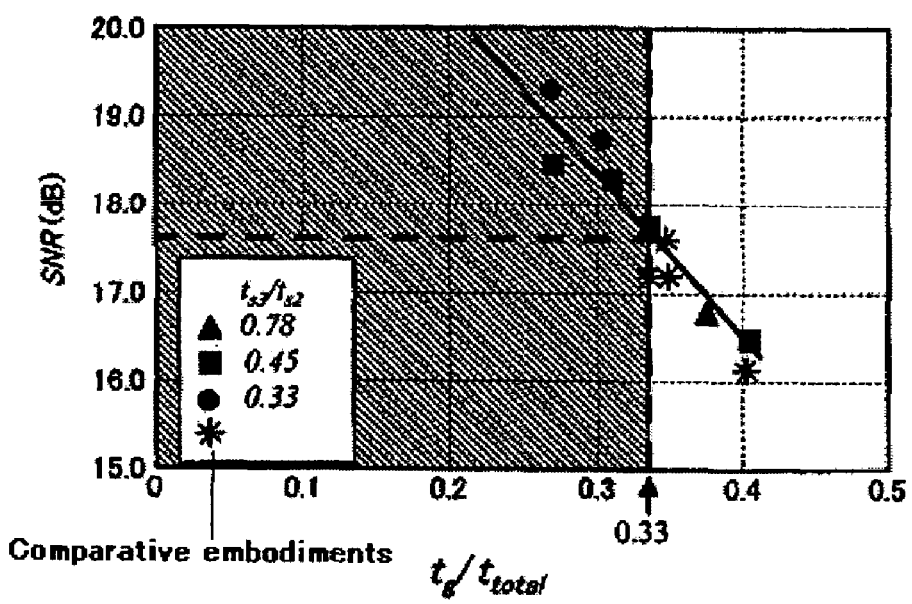
FIG. 4 is a view illustrating the relation of SNR and the center of gravity of a magnetic recording medium according to an embodiment of the preset invention, where the center of gravity is at the second layer, and a reference medium.
Figure 5:
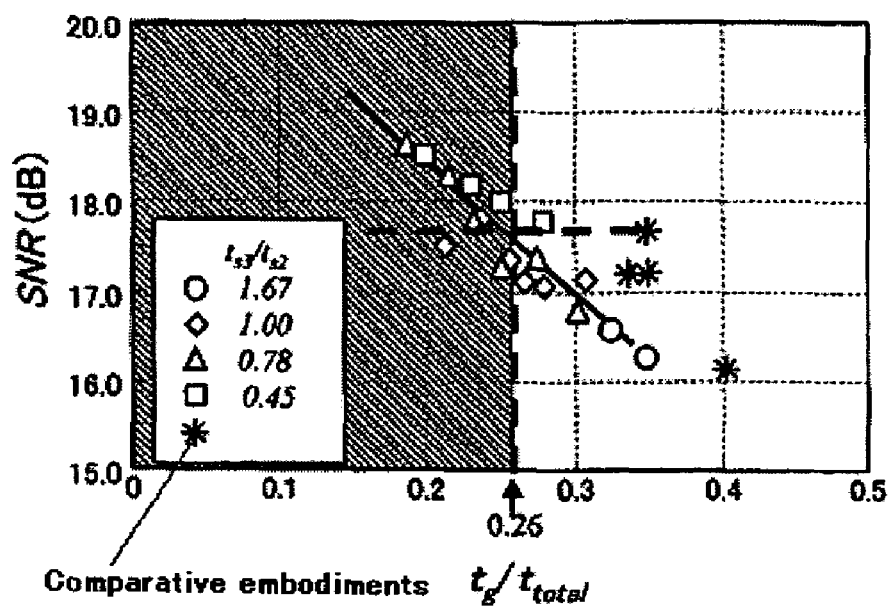
FIG. 5 is a view illustrating the relation of SNR and the center of gravity of a magnetic recording medium according to an embodiment of the present invention, where the center of gravity is at the third layer, and a reference medium.

FIGS. 4 and 5 are views illustrating $t_g/t_{total}$ dependency of SNR. Here, the recording magnetization patterns were alternately recorded in the positive direction and the negative direction when the inversion interval of magnetization was 63.5 nm and the track running direction of the medium was positive (hereinafter, the inversion interval of magnetization will be called recording bit length). The gap length of a recording head was 0.11 µm, the shield gap length of a read head was 65 nm, and the spacing between the head and medium was 21 nm.

FIG. 4 is a case when the center of gravity G is at the second layer, and FIG. 5 is a case when the center of gravity G is at the third layer. In the drawings, identical marks result from changing the ratios of saturation magnetization while the ratios of film thickness of the second and third layers are kept constant. Referring to FIG. 4, when the center of gravity G is at the second layer, higher SNR can be obtained compared to the comparative AFC medium by making $t_g/t_{total}$ to be smaller than 0.33.

Referring to FIG. 5, when the center of gravity G is at the third layer and $t_g/t_{total}$ is larger than about 0.26, SNR is equivalent or deteriorated to the comparative AFC medium even if $M_{S3}/M_{S2}$ is increased. This means that the effect by increasing of $M_{S3}/M_{S2}$ cannot be seen. On the other hand, it was found that by making $t_g/t_{total}$ to be about 0.26 or lower, SNR would be increased compared to the comparative AFC medium. As shown in the drawing, it was found that SNR would not be increased when $t_3/t_2$ was about 1 or larger (diamond mark) and $t_g/t_{total}$ was 0.26 or smaller. Accordingly, it was found that only increasing $M_{S3}/M_{S2}$ would provide almost no effect for increasing SNR without taking the second and third film thicknesses into consideration and that it would be required to decrease $t_g/t_{total}$ by decreasing $t_3/t_2$.

As shown in the FIGS. 4 and 5, it was found that higher SNR could be obtained when the center of gravity was at the second layer compared to being at the third layer on condition that both $t_g/t_{total}$ values were equal.

Next, the saturation magnetization and film thickness of a medium for obtaining better SNR compared to a conventional AFC medium will be considered.

Figure 6:
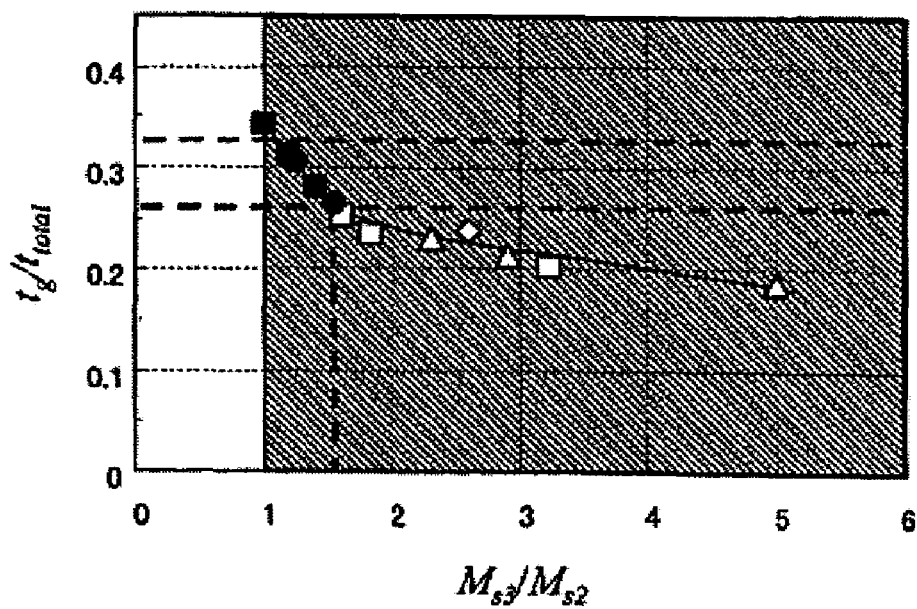
FIG. 6 is a view illustrating the relation of the center of gravity and the ratios of saturation magnetization of the second and third layers.

FIG. 6 is a view illustrating relation between $t_g/t_{total}$ and $M_{S3}/M_{S2}$ of a medium with better SNR compared to a conventional AFC medium from the results obtained in FIGS. 4 and 5. Marks in the drawing are identical to those in FIGS. 4 and 5. Filled marks are for a case when the center of gravity G is at the second layer, and outline marks are for a case when the center of gravity G is at the third layer. When the center of gravity is at the second layer, it was found that $M_{S3}/M_{S2}$ should be larger than 1 for making $t_g/t_{total}$ to be smaller than about 0.33. Also when the center of gravity is at the third layer, it was found that $M_{S3}/M_{S2}$ should be 1.55 or larger for making $t_g/t_{total}$ to be about 0.26 or smaller. As described above, it was found that $M_{S3}/M_{S2}$ should be larger than about 1 for obtaining better SNR than a conventional AFC medium.

Figure 7:
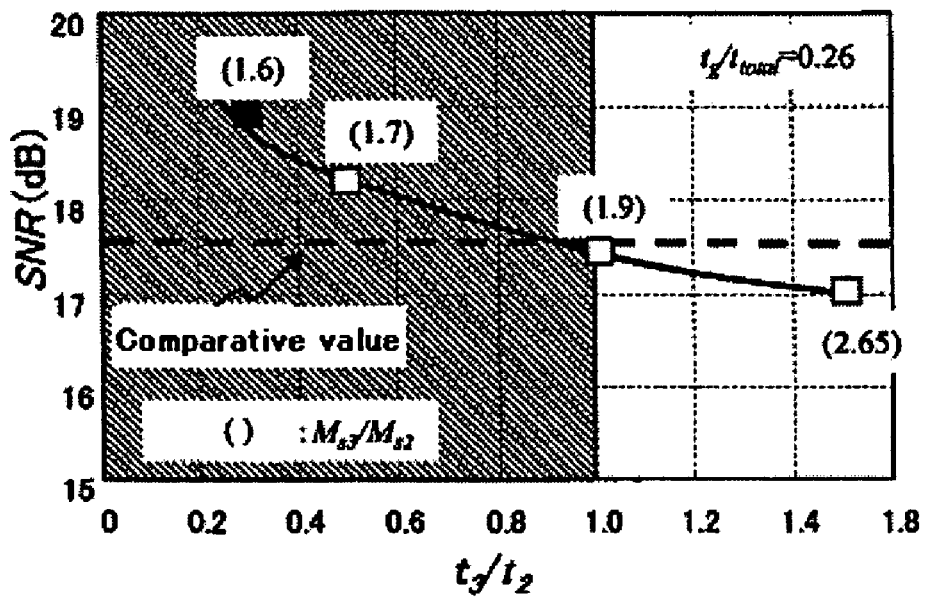
FIG. 7 is a view illustrating the relation of SNR and the ratios of film thickness of the second and third layers.

Next, the film thickness condition for obtaining better SNR than a conventional AFC medium was found when $t_g/t_{total}$ was 0.33 or lower and $M_{S3}/M_{S2}$ was larger than 1. FIG. 7 is the result of calculation of the relation between SNR and $t_3/t_2$ on condition that $t_g/t_{total}$ is constant 0.26. Respective $M_{S3}/M_{S2}$ values are shown in parentheses. In all the conditions, $M_{S3}/M_{S2}$ is larger than 1. In the drawing, filled marks are for a case when the center of gravity G is at the second layer, and outline marks are for a case when the center of gravity G is at the third layer. In the drawing, the highest SNR value of the comparative embodiments is indicated by a dotted line. As a result, it was found that $t_3/t_2$ should be smaller than 1.0 (the film thickness of the third ferromagnetic layer should be thinner than the film thickness of the second ferromagnetic layer) for obtaining higher SNR than the comparative embodiments.

According to the results of FIGS. 6 and 7, it was found that $M_{S3}/M_{S2}$ should be larger than 1 and the film thickness of the third ferromagnetic layer should be thinner than the film thickness of the second ferromagnetic layer for obtaining better SNR than a conventional AFC medium.

Figure 8:
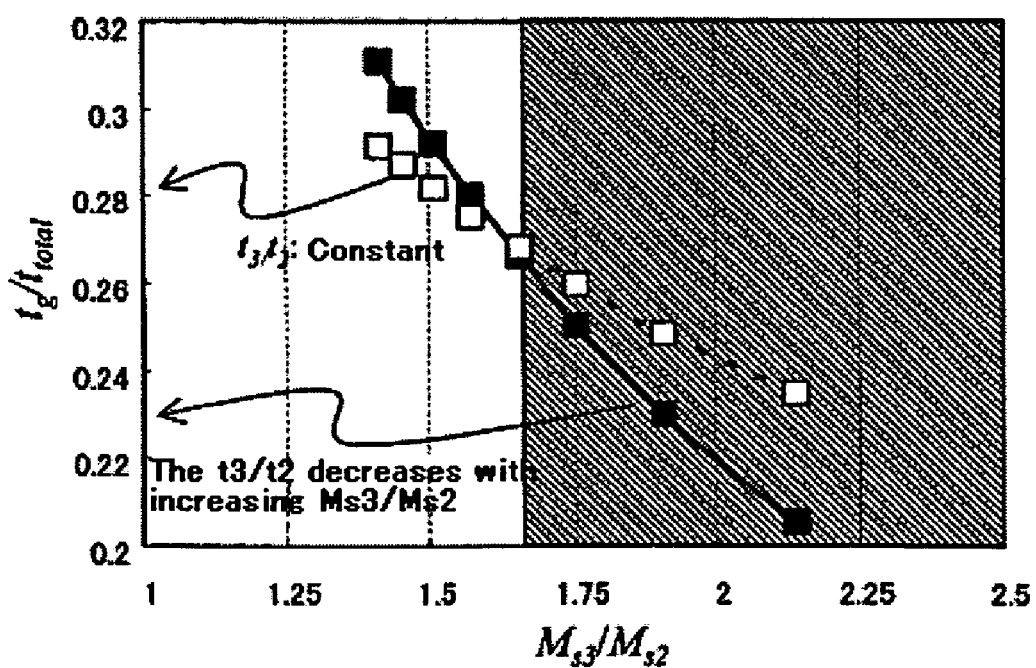
FIG. 8 is a view illustrating the relation of the ratios of film thickness of the second and third layers and the dependence of the ratio of saturation magnetization on the center of gravity.

As a method for making the center of gravity to the medium surface side, there is also a method to reduce the total film thickness without changing the ratio of film thickness $t_3/t_2$ of the second and third ferromagnetic layers. FIG. 8 is a view illustrating the relation between $t_g/t_{total}$ and $M_{S3}/M_{S2}$ when $M_{S2}$ is constant 0.3 T and $M_{S3}$ is increased. Outlined squares are for a case when $t_3/t_2$ is 1.2 and the total film thickness is reduced, and filled squares are for a case when $t_3/t_2$ is reduced while increasing $M_{S3}/M_{S2}$. Thereby, for a medium with changed $t_3/t_2$, $t_g/t_{total}$ would be reduced after $t_3/t_2$ is changed to 1.2 compared to a case when $t_3/t_2$ is made constant. Accordingly, it was found that it would be more effective to reduce the ratio of $t_3/t_2$ than reducing the ratio of total film thickness for making the center of gravity as close as possible to the medium surface side.

Next, following the computer simulation results, media were actually prepared and the SNR measured, and the results are shown below.

Figure 9:
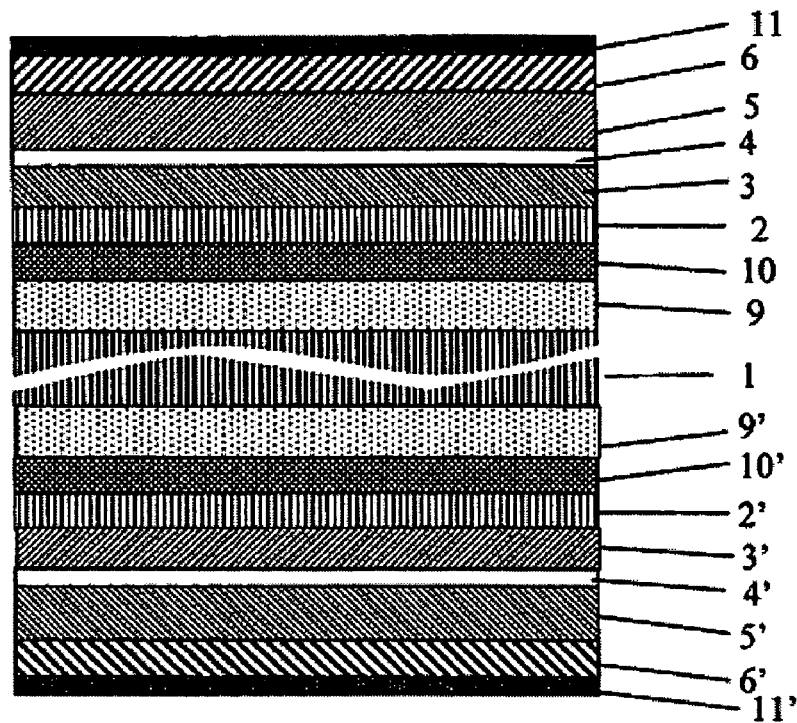
FIG. 9 is a view of the sectional structure of an AFC medium of one embodiment.

FIG. 9 is a view of sectional structure of an AFC medium of one embodiment, which was actually prepared. On a glass substrate 1, preseed layers 9, 9', seed layers 10, 10', underlayers 2, 2', first magnetic layers 3, 3', middle layers 4, 4', second magnetic layers 5, 5', third magnetic layers 6, 6' and overcoat films 11, 11' were orderly laminated. A film fabricating device is made by Intevac Inc. (Intevac 250B). The film fabricating process is described below. In a case with no particular description, argon gas pressure was 7 mTorr. First, a Co–50 at % Ti preseed layer was formed to be 12 nm thick on a substrate 1 under the gas pressure of 5 mTorr, then a W–30 at % Co seed layer was formed to be 3 nm, and then the substrate temperature was increased to 300-400° C. and oxygen blow was performed under the gas pressure of 3 mTorr using Ar+1 vol % $O_2$ gas. In addition, a Cr–10 at % Ti–3 at % B underlayer was formed to be 4-10 nm thick, a first magnetic layer of Co–14 at % Cr–6 at % P was formed to be 3 nm thick, an Ru middle layer of 0.5 nm thickness and second and third magnetic layers were formed, and then nitrogen blow was performed under the gas pressure of 10 mTorr using Ar+12 vol % $N_2$ gas, and finally a carbon overcoat film containing nitrogen was formed to be 3.5 nm thick. The second and third magnetic layers were prepared with different compositions of Co, Cr, Pt and B and with different film thicknesses.

First Embodiment

A second magnetic layer was formed by 9 nm with the composition of Co–22 at % Cr–13 at % Pt–6 at % B, and a third magnetic layer was formed by 7 nm with the composition of Co–10 at % Cr–14 at % Pt–8 at % B. A medium with the second and third layers respectively used as recording layers (layer thickness of 15 nm) was prepared, and the saturation magnetization was measured for the respective layers. As for a measurement method, a method for detecting an A.C. field generated by vibrating measurement specimen (VSM measurement) or an optical method using a phenomenon of inclination of the polarization angle of reflected light in response to the magnetization quantity (Kerr effect) can be used. In the present measurement, the measurement method by Kerr effect was used. The saturation magnetization of a medium with the composition of Co–22 at % Cr–13 at % Pt–6 at % B was 0.25 T, and the saturation magnetization of a medium with the composition of Co–10 at % Cr–14 at % Pt–8 at % B was 0.7 T. The center of gravity was at the third layer, and $t_g/t_{total}$ is calculated to be 0.21.

Second Embodiment

A second magnetic layer was formed by 9 nm with the composition of Co–21 at % Cr–12 at % Pt–8 at % B, and a third magnetic layer was formed by 7 nm with the composition of Co–12 at % Cr–14 at % Pt–12 at % B. A medium with the second and third layers respectively used as recording layers (layer thickness of 15 nm) was prepared, and the saturation magnetization was measured. The saturation magnetization of a medium with the composition of Co–21 at % Cr–12 at % Pt–8 at % B was 0.33 T, and the saturation magnetization of a medium with the composition of Co–12 at % Cr–14 at % Pt–12 at % B was 0.58 T. The center of gravity was at the third layer, and $t_g/t_{total}$ was calculated to be 0.26.

Third Embodiment

A second magnetic layer was formed by 11 nm with the composition of Co–18 at % Cr–12 at % Pt–8 at % B, and a third magnetic layer was formed by 5 nm with the composition of Co–12 at % Cr–13 at % Pt–12 at % B. A medium with the second and third layers respectively used as recording layers (layer thickness of 15 nm) was prepared, and the saturation magnetization was measured. The saturation magnetization of a medium with the composition of Co–18 at % Cr–12 at % Pt–8 at % B was 0.39 T, and the saturation magnetization of a medium with the composition of Co–12 at % Cr–13 at % Pt–12 at % B was 0.55 T. The center of gravity was at the second layer, and $t_g/t_{total}$ was calculated to be 0.28.

Fourth Embodiment

A second magnetic layer was formed to be 9 nm thick with the composition of Co–22 at % Cr–13 at % Pt–6 at % B, and a third magnetic layer was formed to be 7 nm thick with the composition of Co–10 at % Cr–14 at % Pt–8 at % B. A medium with the second and third layers respectively used as recording layers (layer thickness of 15 nm) was prepared, and the saturation magnetization was measured for the respective layers. As for a measurement method, a method for detecting an A.C. field generated by vibrating measurement specimen (VSM measurement) or an optical method using a phenomenon of inclination of the polarization angle of reflected light in response to the magnetization quantity (Kerr effect) can be used. In the present measurement, the measurement method by Kerr effect was used. The saturation magnetization of a medium with the composition of Co–22 at % Cr–13 at % Pt–6 at % B was 0.25 T, and the saturation magnetization of a medium with the composition of Co–10 at % Cr–14 at % Pt–8 at % B was 0.7 T. The center of gravity was at the third layer, and $t_g/t_{total}$ is calculated to be 0.21.

A second magnetic layer was formed to be 9 nm thick with the composition of Co–21 at % Cr–12 at % Pt–8 at % B, and a third magnetic layer was formed to be 7 nm thick with the composition of Co–12 at % Cr–14 at % Pt–12 at % B. A medium with the second and third layers respectively used as recording layers (layer thickness of 15 nm) was prepared, and the saturation magnetization was measured. The saturation magnetization of a medium with the composition of Co–21 at % Cr–12 at % Pt–8 at % B was 0.33 T, and the saturation magnetization of a medium with the composition of Co–12 at % Cr–14 at % Pt–12 at % B was 0.58 T. The center of gravity was at the third layer, and $t_g/t_{total}$ was calculated to be 0.26.

A second magnetic layer was formed to be 11 nm thick with the composition of Co–18 at % Cr–12 at % Pt–8 at % B, and a third magnetic layer was formed to be 5 nm thick with the composition of Co–12 at % Cr–13 at % Pt–12 at % B. A medium with the second and third layers respectively used as recording layers (layer thickness of 15 nm) was prepared, and the saturation magnetization was measured. The saturation magnetization of a medium with the composition of Co–18 at % Cr–12 at % Pt–8 at % B was 0.39 T, and the saturation magnetization of a medium with the composition of Co–12 at % Cr–13 at % Pt–12 at % B was 0.55 T. The center of gravity was at the second layer, and $t_g/t_{total}$ was calculated to be 0.28.

A second magnetic layer was formed to be 12 nm thick with the composition of Co–18 at % Cr–12 at % Pt–9 at % B, and a third magnetic layer was formed to be 4 nm thick with the composition of Co–11 at % Cr–14 at % Pt–8 at % B. A medium with the second and third layers respectively used as recording layers (layer thickness of 15 nm) was prepared, and the saturation magnetization was measured. The saturation magnetization of a medium with the composition of Co–18 at % Cr–12 at % Pt–9 at % B was 0.37 T, and the saturation magnetization of a medium with the composition of Co–11 at % Cr–14 at % Pt–8 at % B was 0.66 T. The center of gravity was at the second layer, and $t_g/t_{total}$ was calculated to be 0.25.

First Comparative Embodiment

A second magnetic layer was formed to be 8 nm thick with the composition of Co–18 at % Cr–14 at % Pt–8 at % B, and a third magnetic layer was formed to be 8 nm thick with the same composition as the second magnetic layer. Additionally, a medium with the second (third) layer used as a recording layer (layer thickness of 15 nm) was prepared, and the saturation magnetization was measured. As a result, the saturation magnetization was 0.45 T. The center of gravity was at the third layer, and $t_g/t_{total}$ was calculated to be 0.34. The present embodiment presents a conventional AFC medium.

Second Comparative Embodiment

A second magnetic layer was formed to be 8 nm thick with the composition of Co–22 at % Cr–12 at % Pt–8 at % B, and a third magnetic layer was formed to be 8 nm thick with the composition of Co–12 at % Cr–14 at % Pt–12 at % B. A medium with the second and third layers respectively used as recording layers (layer thickness of 15 nm) was prepared, and the saturation magnetization was measured for the respective layers. The saturation magnetization of a medium with the composition of Co–22 at % Cr–12 at % Pt–8 at % B was 0.31 T, and the saturation magnetization of a medium with the composition of Co–12 at % Cr–14 at % Pt–12 at % B was 0.58 T. The center of gravity was at the third layer, and $t_g/t_{total}$ was calculated to be 0.26. This means that the Comparative Second Embodiment presents a comparative case when the second and third film thicknesses of the medium with $t_g/t_{total}$ of 0.26 are equal.

Figure 10:
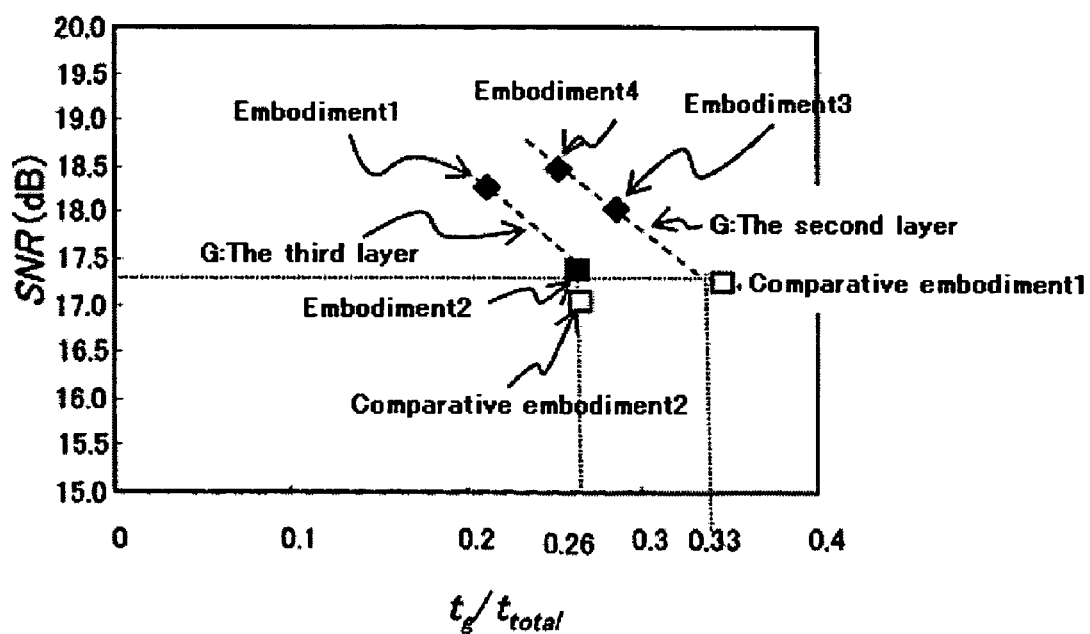
FIG. 10 is a view illustrating the relation of SNR and the center of gravity of the Embodiment and the Comparative Embodiments.

SNRs were measured for media described in the Embodiments 1-4 and the First and Second Comparative Embodiments. The gap length of a recording head was 0.11 μm, the shield interval of a read head was 65 nm, and the spacing between the head and medium was 21 nm. The recording bit length was 63.5 nm. FIG. 10 shows the result.

It was found that SNR of the First Embodiment was better than the First Comparative Embodiment by 1 dB. It was slightly better for the Second Embodiment than the First Comparative Embodiment. Accordingly, it was found that $t_g/t_{total}$ should be about 0.26 or smaller for increasing SNR than a conventional AFC medium with equal compositions and film thicknesses of the second and third layers when the center of gravity was at the third layer.

It was found that from the Embodiments 3 and 4, when the center of gravity was at the second layer, $t_g/t_{total}$ should be smaller than about 0.33 for increasing SNR in comparison with the First Comparative Embodiment, where the relation between SNR and $t_g/t_{total}$ was indicated by a dotted line in the drawing. As a result, it was found that $M_{S3}/M_{S2}$ should be larger than 1 for making $t_g/t_{total}$ to be smaller than about 0.33.

As shown in the drawings, it was found that the center of gravity at the second layer could provide better SNR than that at the third layer. This is because steeper magnetization transitions are formed for both the second and third layers as the center of gravity is at the second layer.

In addition, as in the Second Comparative Embodiment, it was found that SNR would be deteriorated compared to a conventional AFC medium as long as the film thicknesses of the third and second layers are equal even when $M_{S3}/M_{S2}$ is larger than 1. This means that the film thickness of the third layer should be thinner than that of the second layer according to the comparison to the above mentioned four embodiments.

According to the present invention, the contents of Cr, Pt and B are controlled in preparing a medium with a different saturation magnetization value. Though the above mentioned embodiments are for two ferromagnetic layers above a nonmagnetic layer, similar effect can be obtained even for other multilayered structures such as three-layered or more. This is because the position of center of gravity can be to the medium surface side similarly to the two-layered case. In this case, the effective product $(M_s t)_{eff}$ of the saturation magnetization and the film thickness is defined by the following formula, and the center of gravity is defined by the distance from the medium surface layer for obtaining $(M_s t)_{eff}/2$. Similar effects can be obtained by structures with more than two ferromagnetic layers above the nonmagnetic layer.

$$\sum_i M_{si} t_i - M_{sl} t_l \qquad \text{Formula 1}$$

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic recording medium comprising:
a substrate;
an underlayer formed on the substrate;
a first ferromagnetic layer formed on the underlayer;
a nonmagnetic layer formed on the first ferromagnetic layer;
a second ferromagnetic layer formed on the nonmagnetic layer; and
a third ferromagnetic layer formed on the second ferromagnetic layer,
the first ferromagnetic layer and the second ferromagnetic layer being antiferromagnetically coupled via the nonmagnetic layer, the second ferromagnetic layer and the third ferromagnetic layer being ferromagnetically coupled,
wherein, where the saturation magnetization of the first ferromagnetic layer is $M_{S1}$ and the film thickness thereof is $t_1$, the saturation magnetization of the second ferromagnetic is $M_{S2}$ and the film thickness thereof is $t_2$, the saturation magnetization of the third ferromagnetic layer is $M_{S3}$ and the film thickness thereof is $t_3$, and the film thickness of the nonmagnetic layer is $t_n$, the effective product $(M_s t)_{eff}$ of the saturation magnetization and the film thickness of the magnetic recording medium is defined as $(M_s t)_{eff} = M_{S2} t_2 + M_{S3} t_3 - M_{S1} t_1$, and where the distance $t_g$ is defined as the distance from the upper surface of the third ferromagnetic layer to the center of gravity G, and $t_g = (M_s t)_{eff}/(2M_{s3})$; when the center of gravity G is at the third ferromagnetic layer, $t_g = ((M_s t)_{eff}/2 - M_{s3}t_3)/M_{s2} + t_3$; when the center of gravity G is at the second ferromagnetic layer, and, the value $t_g/t_{total}$ obtained by normalizing the distance $t_g$ by $t_1+t_2+t_3+t_n(=t_{total})$ is smaller than about 0.33;

wherein the film thickness of the third ferromagnetic layer is thinner than the film thickness of the second ferromagnetic layer;

wherein the ratio of the saturation magnetization $M_{s3}$ of the third ferromagnetic layer to the saturation magnetization $M_{s2}$ of the second ferromagnetic layer is larger than about 1.

2. A magnetic recording medium according to claim 1, wherein the center of gravity G is at the second ferromagnetic layer.

3. A magnetic recording medium according to claim 2, wherein, the film thickness of the third ferromagnetic layer is thinner than the film thickness of the second ferromagnetic layer.

4. A magnetic recording medium according to claim 1, wherein the center of gravity G is at the third ferromagnetic layer, the value $t_g/t_{total}$ being about 0.26 or smaller.

* * * * *

UNITED STATES PATENT AND TRADEMARK OFFICE
CERTIFICATE OF CORRECTION

| | | |
|---|---|---|
| PATENT NO. | : 7,645,528 B2 | Page 1 of 1 |
| APPLICATION NO. | : 11/226971 | |
| DATED | : January 12, 2010 | |
| INVENTOR(S) | : Akagi et al. | |

It is certified that error appears in the above-identified patent and that said Letters Patent is hereby corrected as shown below:

After "Fourth Embodiment"

Column 8, please delete lines 28-67, column 9, please delete lines 1-14, and insert the following:

-- A second magnetic layer was formed to be 12 nm thick with the composition of Co-18at%Cr-12at%Pt-9at%B, and a third magnetic layer was formed to be 4 nm thick with the composition of Co-11at%Cr-14at%Pt-8at%B. A medium with the second and third layers respectively used as recording layers (layer thickness of 15 nm) was prepared, and the saturation magnetization was measured. The saturation magnetization of a medium with the composition of Co-18at%Cr-12at%Pt-9at%B was 0.37 T, and the saturation magnetization of a medium with the composition of Co-11at%Cr-14at%Pt-8at%B was 0.66 T. The center of gravity was at the second layer, and $t_g/t_{total}$ was calculated to be 0.25. --

Claim 1, column 10, line 57, please delete "is $M_{s2}$" and insert -- layer is $M_{s2}$ --

Signed and Sealed this

Twenty-third Day of March, 2010

David J. Kappos
*Director of the United States Patent and Trademark Office*